(12) United States Patent
Marmigere et al.

(10) Patent No.: US 7,353,394 B2
(45) Date of Patent: Apr. 1, 2008

(54) SYSTEM AND METHOD FOR DIGITAL SIGNATURE AUTHENTICATION OF SMS MESSAGES

(75) Inventors: Gerard Marmigere, Drap (FR); Zsolt Szalai, Tourrettes-sur-Loup (FR)

(73) Assignee: International Business Machine Corporation, Armonk, NY (US)

(*) Notice: Subject to any disclaimer, the term of this patent is extended or adjusted under 35 U.S.C. 154(b) by 945 days.

(21) Appl. No.: 10/464,974

(22) Filed: Jun. 19, 2003

(65) Prior Publication Data

US 2003/0236981 A1 Dec. 25, 2003

(30) Foreign Application Priority Data

Jun. 20, 2002 (EP) .................... 02368064

(51) Int. Cl.
*H04L 9/00* (2006.01)
*H04L 9/32* (2006.01)

(52) U.S. Cl. ........................................ 713/170; 726/10

(58) Field of Classification Search ............... 726/2, 726/10; 713/170, 171, 168; 380/247
See application file for complete search history.

(56) References Cited

U.S. PATENT DOCUMENTS

| 6,707,915 B1* | 3/2004 | Jobst et al. ................. 380/247 |
| 6,741,848 B2* | 5/2004 | Timonen et al. ............ 455/405 |
| 2003/0014315 A1* | 1/2003 | Jaalinoja et al. .............. 705/18 |

OTHER PUBLICATIONS

3GPP, "Technical Realization of the Short Message Service", 3GTS23.040 V.3.2.0, Oct. 1999.*

* cited by examiner

*Primary Examiner*—Gilberto Barron, Jr.
*Assistant Examiner*—Laurel Lashley
(74) *Attorney, Agent, or Firm*—James Palmer; Hoffman, Warnick & D'Alessandro LLC

(57) ABSTRACT

The invention allows SMS messages authentication through the use of a digital signature computed with the International Mobile Equipment Identity (IMEI) as a key. Particularly, a text messaging system having the ability to send SMS messages to remotely managed wireless terminal equipment is disclosed and includes a system to generate such digital signature and to store it in available Information Element fields of the TP-User Data of the SMS message. Receiving wireless terminal equipment that are configured for IMEI-based signature security, still keep the option to process both SMS messages having the IMEI-based signature or not. Receiving wireless terminal equipment not enabled for IMEI-based signature security process the SMS normally.

12 Claims, 3 Drawing Sheets

SYSTEM AND METHOD FOR DIGITAL SIGNATURE AUTHENTICATION OF SMS MESSAGES

TECHNICAL FIELD

The present invention relates to the management of wireless terminal user equipment in general and in particular to a system and method for the authentication of SMS messages.

BACKGROUND OF THE INVENTION

History has shown through phenomenons that have accompanied large scale development of the personal computer, that there is a category of people who find interest in maliciously penetrating other users' computing systems. Their motivation can include direct material benefit (e.g. use of a user's credentials stored in the computer to perform commercial or financial transactions), or benefit derived from access to confidential information (private information, trade or technology secrets). Sometimes it is just for the—arguable—fun of the performance (e.g. password cracking, virus dissemination, etc.). Whichever the motivation, this behaviour is a strong indication that, when a new field of action opens up, the same energy will be spent again on malicious attacks.

The wireless communications environment is one of the next likely fields of action. Mobile telephony has grown to hundreds of millions of users and is keeping a strong status image. In addition, mobile device evolution is clearly directed toward development of the computing power: faster processors, substantial storage, functional and applications richness. In fact, the catalogue of most major mobile device vendors includes devices that look very much like personal computers and in an increasing number of instances can replace them. Those devices, as they continue evolving, will play a significant role in business and personal activities.

Mobile communication networks may support various wireless technologies, and particularly the European Standard known as the Global System for Mobile Communications (GSM) or the enhanced General Packet Radio Services (GPRS). Text messages, particularly Short Message Services (SMS) messages may be exchanged between mobile devices through Short Message Service Centers (SMSC). A specific short message type handled by digital wireless networks enables the receiving mobile devices to be remotely managed by a remote device management application system. Such specific SMS results in parameter change commands or software elements to be applied to the device and it will be referred to as 'Configuration SMS' for this discussion. Configuration SMS's may be used in two ways to remotely manage GSM or GPRS-connected mobile devices from the device management application. A first approach is to use the SMS as a content vehicle carrying actual configuration parameters to be applied to the device. A second approach is to use SMS as a trigger to which the device responds by launching a connection (e.g. Over-The-Air (OTA) connection, Sync ML/DM connection) to a management server to perform management-oriented synchronization activities (such as Inventory, Configuration, Software Download).

In both cases, the use of the SMS technology "as is" is exposing the device to malicious attempts. If the SMS carrying configuration instructions is of malicious origin, commands or software elements carried by the SMS can introduce malicious entities into the terminal equipment (e.g. undesired parameter changes, personal information retrieving, virus code downloading to name a few). If the SMS is used to trigger a management session to a spoof server, similar malicious actions may be performed over the management session. In fact, a mere knowledge of the mobile device's telephone number (also known as the MSISDN) and a basic skill in the SMS technology suffice to gain access.

Thus, it has been a main concern to secure the SMS against hacker attacks. Some recommendations for GSM security have been made available for example in the ETSI GSM 03.48 Technical Specification titled "Security Mechanisms for the SIM application toolkit". While this publication addresses somehow the SMS security problem, the described mechanism only covers security for SMS's carrying executable information to be loaded onto the Subscriber Identity Module (SIM card). However, using the SIM card to remotely configure a wireless device with SMS is only one way to operate. Several other possibilities exist where the configuration parameters and the software carried in the SMS's may be applied to the device's operating system without execution in the SIM card. Therefore, there is still a potential target for hacker attacks.

Moreover, a drawback of the SIM-oriented implementation is that the SIM card is associated with the service subscription, i.e. the Wireless Network Operator. As a consequence, the existing security solutions are limited to their use by the Operator.

It is therefore essential to apply a commensurate level of security against malicious tampering with the device configuration and software integrity, attempted through means that bypass the SIM card.

Accordingly, there is a real need for a general purpose security solution for wireless terminal user equipment remotely managed through SMS messages, which is independent of the Subscriber Identity Module.

The present invention offers such solution.

SUMMARY OF THE INVENTION

It is therefore an feature of the invention to provide a system and method to secure the use of wireless terminal user equipment.

It is another feature of the invention to prevent malicious use of SMS's when remotely managing wireless user terminal equipements.

It is another feature of the invention to provide a system and method to secure remote management of a wireless device using Configuration SMS's.

It is yet another feature of the invention to provide a system and method that is applicable to both Wireless Network Operators but also to any other party, typically the Management Services Outsourcers or Enterprises.

The present invention allows SMS message authentication through the use of a digital signature computed with the International Mobile Equipment Identity (IMEI) number as a key. Particularly, a text messaging system having the ability to send SMS messages to remotely managed wireless terminal equipment comprises means to generate such digital signature and to store it in available Information Element fields of the TP-User Data of the SMS message. A receiving wireless terminal equipment may be optionally configured to activate the IMEI-based signature control or not. If the control is activated, Configuration SMS's without signature or whose signature does not verify correctly are rejected. If the control is turned off, Configuration SMS's are processed without signature checking. Wireless Terminal Equipment that are not configured for IMEI-based signature checking will process Configuration SMS's regardless of the presence or absence of an IMEI-based signature.

In a first embodiment, the invention is operable in a text messaging system that comprises means for storing a plurality of equipment identification numbers assigned to a plurality of wireless terminal equipment. The text messaging system is able to send at least one text message to a wireless terminal equipment wherein the text message comprises a frame header part and a frame body. The text messaging system is characterized in that it comprises: means for generating a digital signature based on the equipment identification number assigned to the receiving wireless terminal equipment; and means for storing the digital signature in a non-allocated field of the frame body.

In an advantageous application, the text message is a Short Message Service (SMS) message and the assigned equipment identification number is the International Mobile Equipment Identity (IMEI) number of the SMS receiving wireless terminal equipment.

The invention also relates to a method for authenticating a text message sent by a text messaging system to a wireless terminal equipment, the text messaging system comprising means for storing an equipment identification number assigned to the wireless terminal equipment and the text message comprising at least one unassigned data field, the method comprising the steps of:

at the text messaging system:

generating a digital signature based on the assigned equipment identification number;

storing the digital signature in the at least one unassigned data field; and sending the text message with the digital signature to the wireless terminal equipment;

at the wireless terminal equipment:

receiving the text message;

generating a personal digital signature based a personal equipment identification number stored within the wireless terminal equipment; and comparing the personal digital signature to the incoming digital signature carried within the received text message.

Preferably, the text message is a Short Message Service (SMS) message, and the assigned equipment identification number is the International Mobile Equipment Identity (IMEI) number of the wireless terminal equipment.

Moreover, as already stated, the method also covers the wireless terminal equipment that does not support the IMEI signature authentication and the routine further comprises after the step of receiving the text message, the steps of: determining if the wireless terminal equipment has activated the IMEI signature authentication, and if not ending the authentication process by processing the SMS message.

BRIEF DESCRIPTION OF THE DRAWINGS

The above and other features and advantages of the invention will be better understood by reading the following more particular description of the invention in conjunction with the accompanying drawings wherein.

DETAILED DESCRIPTION OF THE INVENTION

Figure 1:
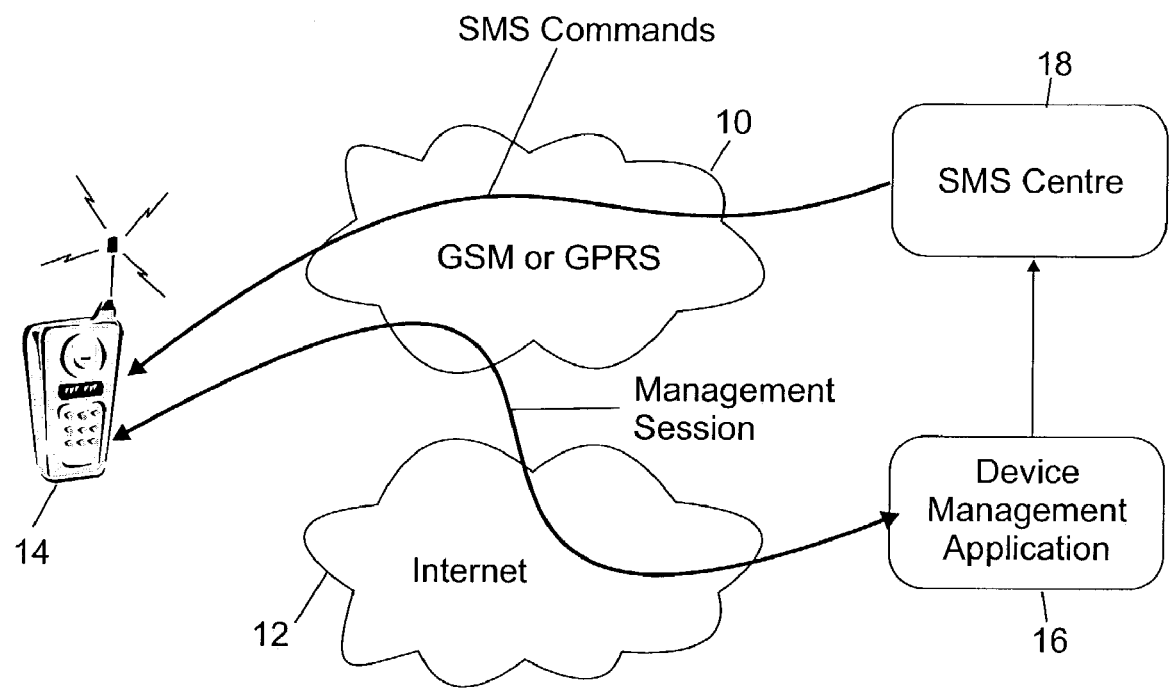
FIG. 1 shows a general view of the communication environment in which this invention applies.

Referring first to FIG. 1, there is depicted a pictorial representation of a text message communication system which may be utilized to implement the method of this invention. As may be seen, message communication system may include composite networks, such as GSM or GPRS networks 10 and Internet network 12. A wireless terminal equipment 14, which may be for example a mobile phone, is remotely managed by a device management application system 16. This embodiment is hereby described for one wireless device remotely managed but as those skilled in the art will easily understand it may be generalized to a plurality and variety of wireless terminal equipment (such as POS, hand-held computers, PDA, . . . ). Each wireless terminal equipment 14 is identified by a unique equipment identification number which is stored in a memory part of the terminal. The device management application system 16 comprises an equipment identification database to store all the identification numbers of the wireless terminals that may be recognized by the management system 16. Generally in GSM networks, such database is known as being an Equipment Identity Register (EIR) that contains all valid mobile phone equipment.

It is to be mentioned that the mobile device may also contain a SIM card to carry individual information relative to the subscriber. No further details of the SIM card functions are hereby developed as it is not useful for the understanding of the invention.

A text message as used in this invention, preferably refers to a Short Message Service (SMS) message that is sent over the GSM or GPRS network. The SMS may contain commands like change instructions for the terminal equipment or may serve as a trigger to launch a management session with the management server. The path for the SMS message issued from the device management application system 16 comprises an SMS Center (SMSC) 18 which is responsible for the relaying, storing and forwarding of SMS's.

Figure 2:
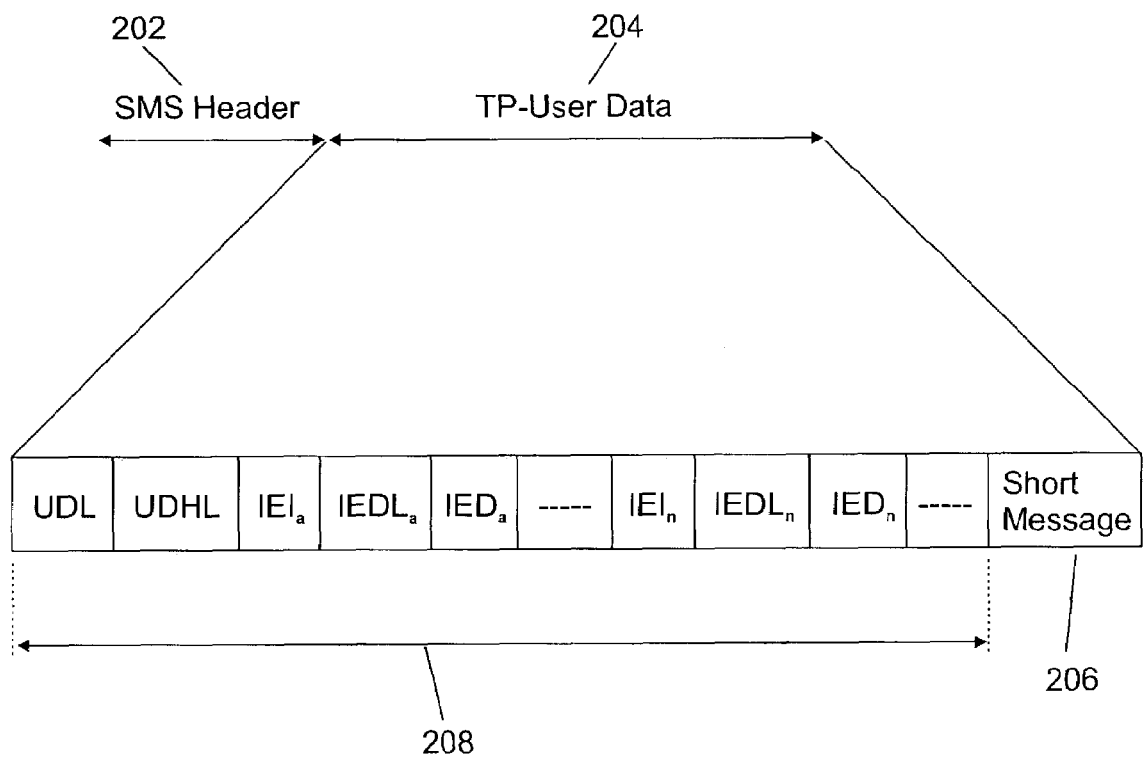
FIG. 2 details the User Data part of a SMS frame.

An SMS that is to be received by the mobile device 14 is a data frame structured as it is now described with reference to FIG. 2. FIG. 2 is a representation of a SMS frame as specified in the 3GPP Technical Specification document "3rd Generation Partnership Project; Technical Specification Group Terminals; Technical realization of the Short Message Service (SMS) (Release 1998)" (referenced 3GPP TS 03.40 V7.5.0 (2001-12).

The SMS message contains a SMS frame Header 202 and a SMS frame Body 204. Generally speaking, the frame Header 202 contains the information related to the propagation, delivery, status and purpose of the SMS.

The frame Body 204 which is also known in the literature as the TP-UD (Transfer-Layer Protocol User Data) may comprise just the short message content itself 206, i.e. the commands to manage the SMS receiving device, or it may have in addition a User Data Header (UDH) 208. Presence of a User Data Header is identified by the setting of an indicator in the SMS frame Header, namely the User Data Header Indicator (UDHI). Where the UDHI value is set to zero the TP-UD field comprises only the short message. Where the value is set to one, it means that the TP-UD field comprises a User Data Header. The UDHI parameter is used in the method of the invention as it will be described later with reference to FIG. 3.

The generalized structure of the User Data Header is zoomed on bottom of FIG. 2, and is mainly made of User Data fields (UDL,UDHL) and a plurality of Information Element groups (IE_a to IE_n). The User Data fields specify the User Data Length (UDL) i.e. the length of the entire short message, and the User Data Header Length (UDHL) i.e. the length of the total UDH. Each Information Element group is composed of an Information Element Identifier field (IEI), an Information Element Data Length field (IEDL) and an Information Element Data field (IED). Some IE groups are currently reserved for specific purposes, for example for Command Packet designation, and the reader may refer to the aforementioned 3GPP Technical Specification document to learn more about it. However, some IE groups are not allocated and free of use, and the present invention takes this advantage to allocate an IE group for the signature incorporation. Specifically, the signature is inserted in an Information Element Data field, and the corresponding IEI and IEDL fields are set to the correct values to indicate the presence and length of the signature.

As already mentioned, the digital signature is a value computed from the IMEI number and the Short Message content. Such computation is a conventional authentication method and various algorithms may be used to obtain the signature value. One example of such algorithms is the well-known MD5 described in "*The MD5 Message-Digest Algorithm*" (Rivest, R., and S. Dusse—RFC 1321—MIT Laboratory for Computer Science, RSA Data Security Inc., April 1992).

Figure 3:
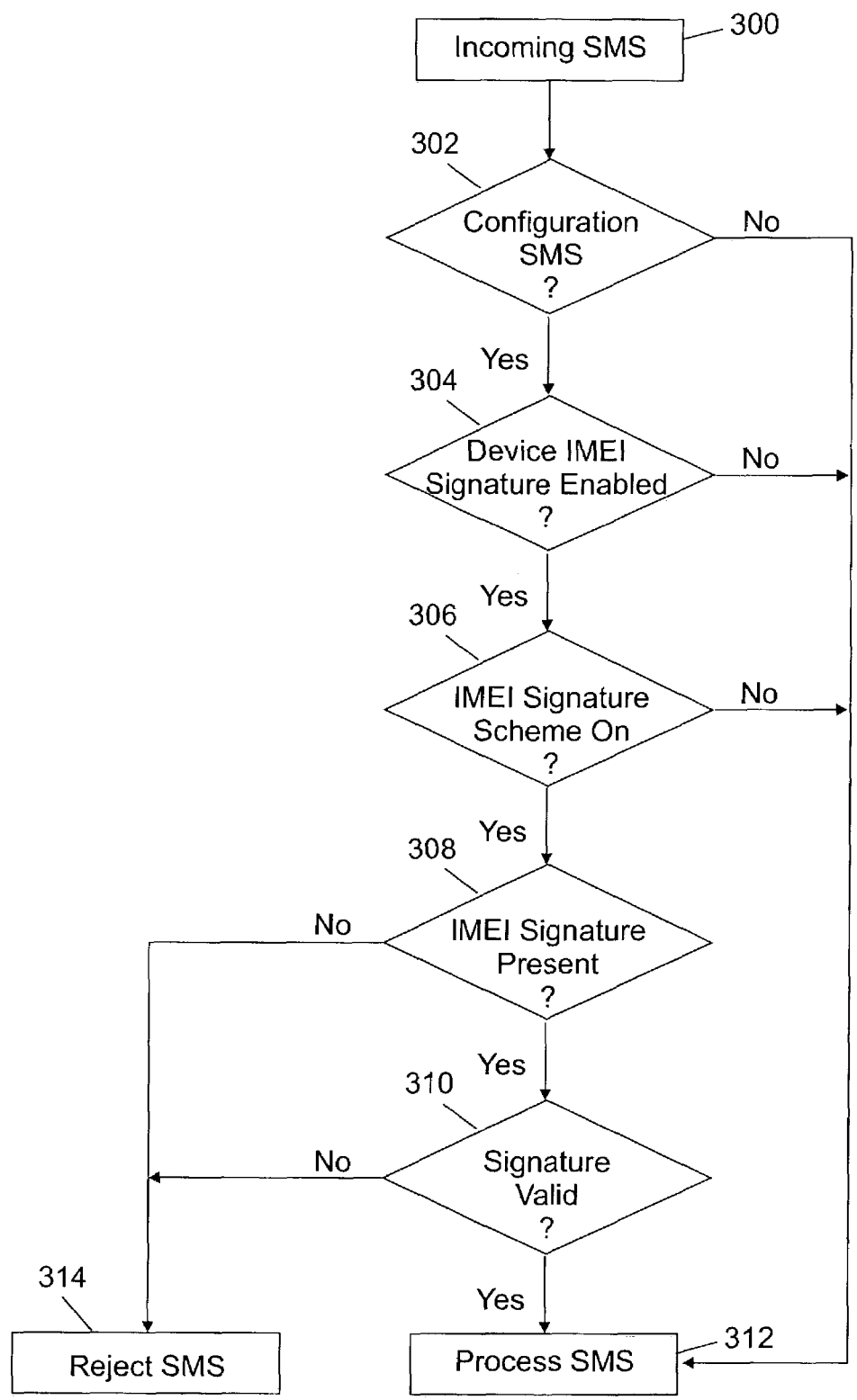
FIG. 3 is a flow diagram of the routine processed at the receiving mobile device.

FIG. 3 is a flow diagram of the routine performed at the device receiving a SMS message. The routine is preferably implemented in a processing area of the mobile device which is outside of the SIM card. Once more, it is to be highlighted the advantage of the present invention over existing alternatives in that the signature mechanism is not linked to the Subscriber Identification Module.

The process starts with the receipt of an incoming SMS message (step 300).

On first step 302, a verification is made on the contents of the incoming SMS to check whether it is a Configuration SMS, that is, if it contains instructions meant for applying parameter or software changes. If not, the SMS is processed normally (step 312).

If the incoming SMS is a Configuration SMS, the next step is to enter the signature verification step 304 provided the logic circuitry to process it has been implemented in the terminal equipment.

If the device has no logic to support IMEI signature authentication, the flow goes directly to step 312 to process the SMS in a standard manner. If the device is IMEI signature enabled, the process follows with step 306.

Step 306 verifies that the IMEI signature enabled device has this security option turned on. If not, again, the SMS is processed normally. If yes, the routine continues with step 308.

Next step 308 checks if there is an Information Element (IE) group in the User Data Header allocated to the signature processing. Specifically, it is checked for the presence of an Information Element Identifier (IEI), an Information Element Data Length (IEDL) and an Information Element Data (IED) allocated to the IMEI signature. If no such IE group is found, the Configuration SMS is rejected.

If an IMEI IE group is found, a personal digital signature is generated on the mobile device using the IMEI number that is already stored in a memory area of the mobile device. The personal digital signature is next compared to the incoming digital signature carried in the SMS message (step 310). A mismatch leads to the SMS being rejected (step 314) while a match between the two signatures allows the SMS to be processed (step 312).

To summarize, the present invention offers the authentication of the configuration SMS through a digital signature based on a confidential key. The key is the IMEI (International Mobile Equipment Identity) which offers several advantages:

each GSM or GPRS mobile equipment has its own and unique IMEI;
the IMEI plays no role in the communications between Users and is therefore not published;
the IMEI already exists, which avoids having to introduce a new scheme to create and distribute the keys.

In addition, the IMEI is tied only to the device and is independent from the service subscription as materialized by the SIM card. Therefore, the present invention applies to device management performed by the Wireless Network Service Provider but also by any other party, for instance Management Services Outsourcers or Enterprises.

The activation of the signature security feature is still optional and requires both parties to agree on its use. Then the managing party needs to activate the "Signature Using IMEI" field in the User Data Header of the SMS, and the user needs to be using a device that is enabled to check the signature and has to have activated this option. If the user has activated the option, Configuration SMS's not signed based on the IMEI key or failing to pass the signature verification are rejected.

It is to be appreciated by those skilled in the art that while the invention has been particularly shown and described with reference to a preferred embodiment thereof, various changes in form and details may be made without departing from the spirit and scope of the invention.

The invention claimed is:

1. A text messaging system for sending at least one text message to a wireless terminal equipment, the text messaging system comprising:

means for storing an equipment identification number assigned to said wireless terminal equipment, wherein the equipment identification number is an International Mobile Equipment Identity (IMEI) number;

means for generating a digital signature based on said assigned equipment identification number; and means for storing both the digital signature in an unallocated Information Element Data (IED) field and an indicator of a presence of the digital signature in a corresponding Information Element Identifier (IEI) field of an available Information Element (IE) group of a User Data Header (UDH) of the at least one text message, wherein the at least one text message is a Short Message Service (SMS) message comprising a SMS frame header and a SMS frame body, wherein the SMS frame body further comprises the UDH and a short message, further wherein the means for storing is independent of both a Subscriber Identity Module (SIM) card and a wireless network operator.

2. The system of claim 1 wherein said wireless terminal equipment is a Short Message Service (SMS) receiving mobile device and said at least one text message is carried over a wireless network.

3. The system of claim 1 wherein said wireless terminal equipment comprises means for storing a personal equipment identification number, and further comprising:

means for receiving said at least one text message;
means for generating a personal digital signature based on said personal equipment identification number; and
means for comparing the digital signature carried within the received at least one text message to the personal digital signature.

4. The system of claim 3 further comprising means for rejecting the received at least one text message if the personal digital signature and the received digital signature mismatch.

5. The system of claim 1 wherein the means for generating a digital signature further comprises means for processing a signature generation algorithm to compute a value based on said assigned equipment identification number and the at least one text message content.

6. The system of claim 3 wherein the means for generating a personal digital signature further comprising means for processing a signature generation algorithm to compute a value based on said personal equipment identification number and the at least one text message content.

7. The system of claim 5 wherein the signature generation algorithm is a hash-function MD5 algorithm.

8. The system of claim 6, wherein the signature generation algorithm is a hash-function MD5 algorithm.

9. A method for authenticating a text message send by a text messaging system to a wireless terminal equipment, the text messaging system comprising means for storing an equipment identification number assigned to the wireless terminal equipment and the text message comprising at least one unassigned data field, the method comprising the steps of:

at the text messaging system;
    generating a digital signature based on the assigned equipment identification number, wherein the equipment identification number is an International Mobile Equipment Identity (IMEI) number;
    storing both the digital signature in an unallocated Information Element Data (IED) field and an indicator of a presence of the digital signature in a corresponding Information Element Identifier (IEI) field of an available Information Element (IE) group of the at least one unassigned data field of a User Data Header (UDH) of the text message, wherein the text message is a Short Message Service (SMS) message comprising a SMS frame header and a SMS frame body, wherein the SMS frame body further comprises the UDH and a short message; and
    sending the text message with the digital signature to the wireless terminal equipment;
at the wireless terminal equipment;
    receiving the text message;
    generating a personal digital signature based on a personal equipment identification number stored within the wireless terminal equipment; and
    comparing the personal digital signature to the incoming digital signature carried within the received text message, further wherein the personal and incoming digital signatures are independent of both a Subscriber Identity Module (SIM) card and a wireless network operator.

10. The method of claim 9 further comprising after the step of receiving the text message, the step of:
    if the wireless terminal equipment supports the IMEI signature authentication, determining if this option is activated, and if not ending the authentication process by processing the SMS message.

11. A wireless terminal equipment comprising means for carrying the method of claim 9.

12. In a digital communication network supporting Short Message Service (SMS) messages delivery to a plurality of mobile devices, each mobile device being identified by a unique International Mobile Equipment Identifier (IMEI), a method for enhancing the delivered SMS messages comprising the steps of:
    for each SMS message, generating a digital signature based on the unique International Mobile Equipment Identifier of the corresponding receiving mobile device;
    storing both the digital signature in a non-allocated Information Element Data (IED) field and an indicator of a presence of the digital signature in a corresponding Information Element Identifier (IEI) field of an available Information Element (IE) group of the User Data Header (UDH) of the respective SMS message comprising a SMS frame header and a SMS frame body, wherein the SMS frame body further comprises the UDH and a short message; and
    sending the enhanced SMS message to the corresponding receiving mobile device, wherein the generating, storing and sending are independent of both a Subscriber Identity Module (SIM) card and a wireless network operator.

* * * * *